UNITED STATES PATENT OFFICE.

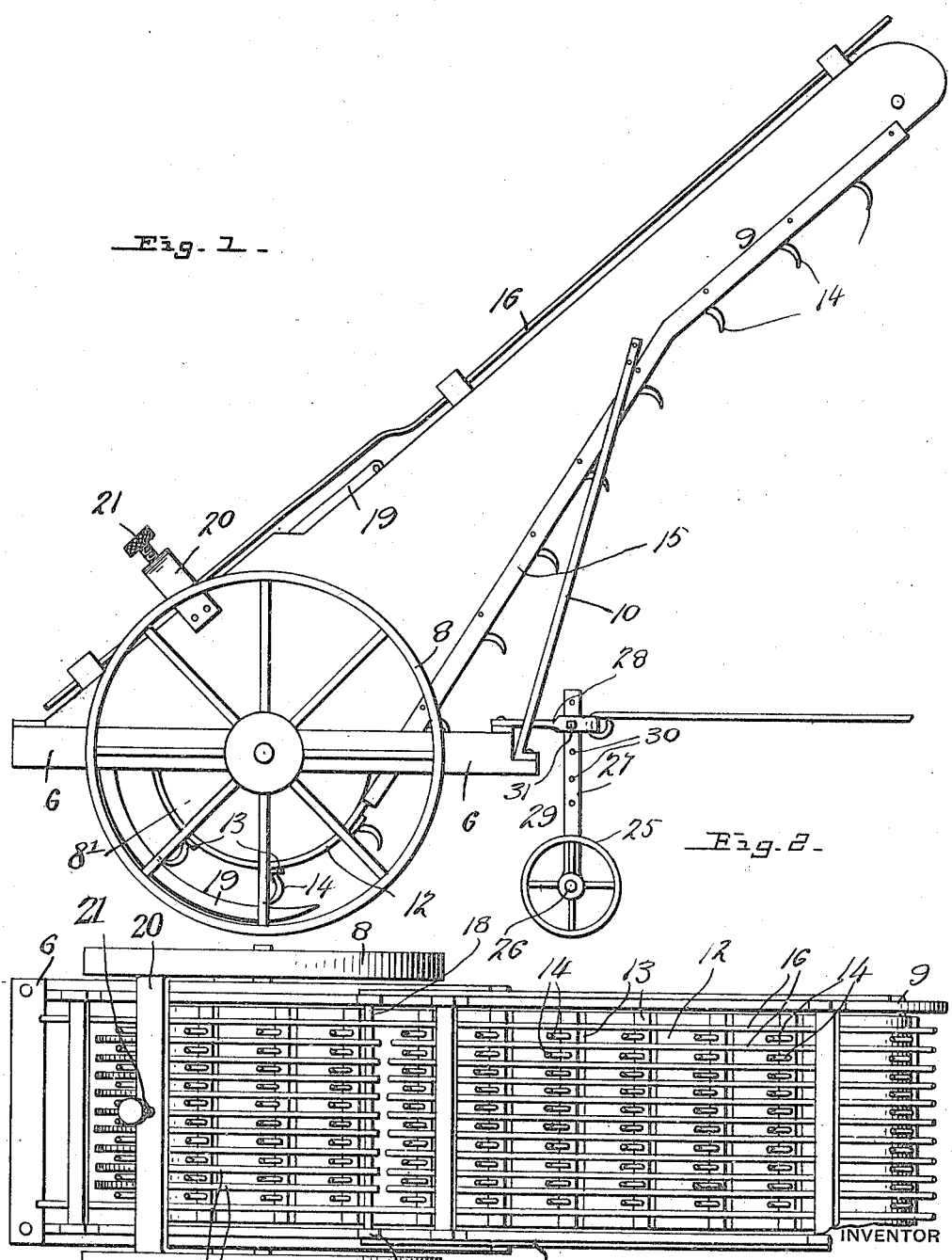

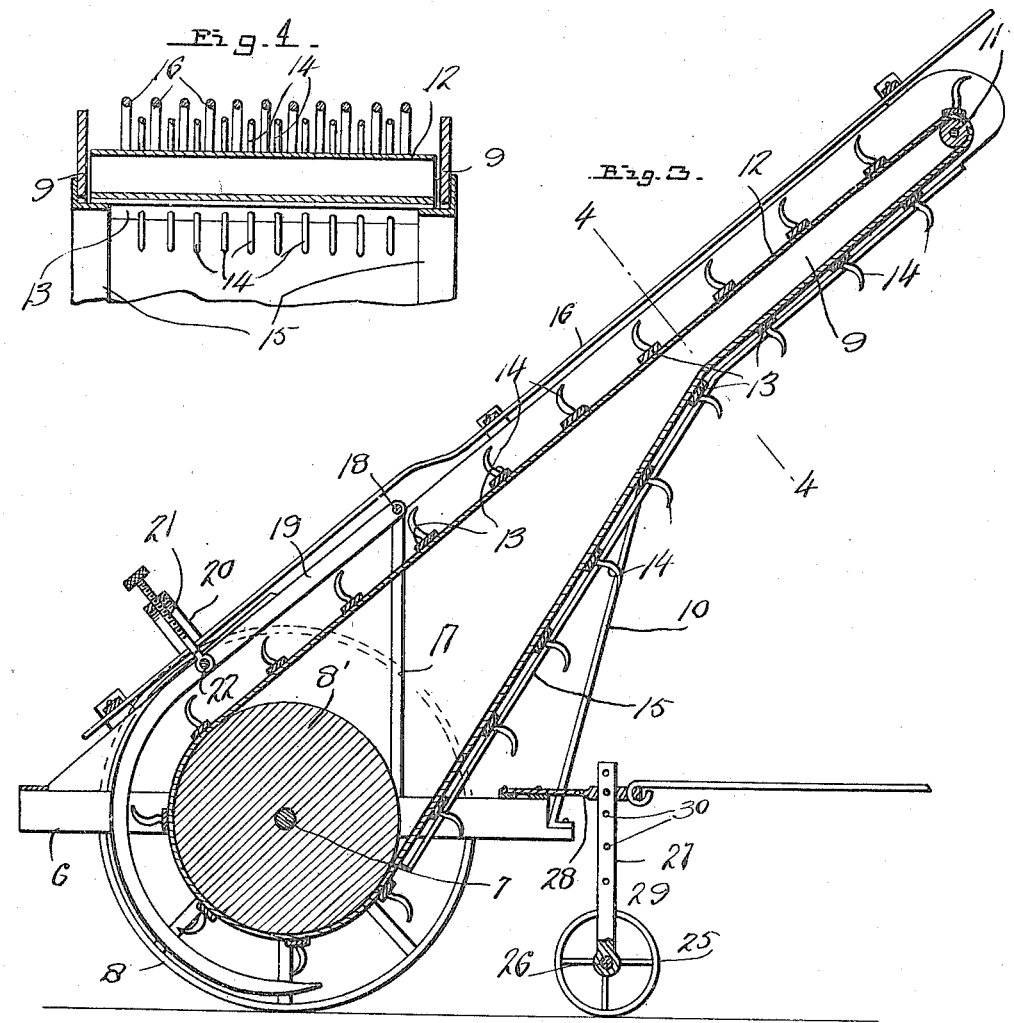

NICHOLAS W. WIEMHOLT, OF BOONVILLE, MISSOURI.

HAY RAKE AND LOADER.

1,264,353.   Specification of Letters Patent.   Patented Apr. 30, 1918.

Application filed December 4, 1916. Serial No. 134,990.

*To all whom it may concern:*

Be it known that I, NICHOLAS W. WIEMHOLT, a citizen of the United States, residing at Boonville, in the county of Cooper and State of Missouri, have invented certain new and useful Improvements in Hay Rakes and Loaders, of which the following is a specification.

This invention relates to agricultural implements, and particularly to hay gathering mechanisms.

The primary object of the invention is to provide a device which embodies a raking device and a loading mechanism, and which is adapted to be associated with a vehicle so that hay or straw may be gathered and delivered to the vehicle as the latter advances over the ground.

A further object of the invention is to provide a device of this character which is arranged so as to recover grain held by the straw or hay. A still further object of the invention is to provide improvements in means for adjusting the rake tines of the device toward and away from the conveyer, and toward and away from the ground. A still further object of the invention is to provide a rake and loader of the character set forth which is constructed in such manner as to collect all hay or straw lying in the path of the same, which is equipped with means for preventing the straw or hay being blown or shaken from the conveyer during the operation of the latter, which is capable of being readily attached to and detached from a vehicle, which is of simple and improved construction, which may be manufactured and maintained at low cost, and which will prove thoroughly efficient in practice.

With these objects in view, together with others which will appear as the description proceeds, the invention resides in the novel formation, combination, and arrangement of parts, all as will be described more fully hereinafter, illustrated in the drawings, and particularly pointed out in the claims.

In the drawings:—

Figure 1 is a side elevation of a rake and loader constructed in accordance with the invention;

Fig. 2 is a plan view of the device;

Fig. 3 is a longitudinal sectional view taken through the rake and loader;

Fig. 4 is a transverse sectional view taken on line 4—4 of Fig. 3; and

Fig. 5 is a fragmentary front elevation of the running gear for the device.

Referring now to the drawings, 6 indicates the carriage frame, which comprises side and end members as shown arranged so as to provide a rectangular frame structure. Arranged between the longitudinal bars of the structure 6 and preferably intermediate the ends of the said bars is an axle 7, the same supporting wheels 8 at its ends. A drum 8' is secured to the axle between the longitudinal members of the frame 6, and rotates with the said axle.

Secured at their lowermost ends to the longitudinal members of the carriage frame 6 are side members 9 of a loader frame. These members project forwardly and upwardly from the carriage frame, and are held in proper position by braces 10. Mounted for rotation between the free ends of the side members 9 is a roller 11, over which passes a conveyer belt 12, the latter passing also over the drum 8' upon the carriage frame. This belt is preferably formed of a continuous strip of canvas or other relatively heavy close mesh fabric, and is provided upon its upper surface with spaced laterally disposed slats 13, carrying outwardly extending teeth or tines 14. The side members of the loader frame have angle bars 15 secured to their lower edges, and which form trackways to guide and support the ends of the slats 13 after the latter have passed over the roller 11 and are traveling toward the drum 8'.

The drum 8' is of such diameter that the teeth carried by the belt passing over the same will project into relatively close engagement with the ground as the machine advances. The teeth 14 are disposed in such manner that hay or straw gathered thereby during the rotation of the drum 8' will be carried upwardly, and as the belt turns over the roller 11 at the upper end of the loader frame, the hay or straw will be dropped.

As the slats 13 extend above the upper surface of the belt, all seed jostled from the hay or other stalk during upward travel will be prevented from becoming lost, and will be deposited in the vehicle with which the machine is used.

A rack or retainer frame 16 extends between the upper edges of the side members of the loader frame 9 and consists of spaced parallel longitudinally arranged bars or ribs as shown. The rods of this frame are preferably co-extensive with the loader frame and are arranged spaced beyond the outer extremities of the conveyer teeth 14. This frame is provided for the purpose of preventing hay or stray carried by the conveyer from being blown or lost therefrom during the loading operation.

Secured to the longitudinal members of the carriage frame 6 and extending upwardly therefrom are posts 17, between the upper ends of which a shaft 18 extends, and pivoted at their inner ends in spaced relation to each other upon the said shaft are rake tines or teeth 19. These teeth are arranged above the outermost extremities of the conveyer teeth, and curve behind the drum 8'. The curved portions of the teeth may, if desired, be concentric with the axle 7. A bracket 20 spans the loader frame adjacent the lower end thereof, and a screw member 21 is threaded through the said bracket and is connected at its inner end to a bar 22 connecting the various rake tines. Rotation of the screw member 21 within its bracket will obviously cause the stem to move inwardly or outwardly thereof, and such movement is transmitted to the rake tines to permit the latter to be adjusted toward or away from the ground, and toward or away from the drum 8'.

From the foregoing, it is apparent that forward movement of mechanism over the ground will create rotary movement in the drum 8' so as to move the conveyer belt 12 in a direction to convey hay or straw upwardly and over the roller 11. The device is adapted to be attached close behind a receiving vehicle, so that the upper forward end of the loader frame projects over the rear end thereof. The rake tines 19 are adjusted by means of the screw member 21 into such position as to gather straw lying upon the field, and the teeth 14 carried by the conveyer 12 pass between the rake tines collecting the straw gathered by the same, and deliver the said straw to the receiving vehicle. During this forward movement, it is apparent that the straw can not become lost from the conveyer, either by being jostled or blown from the same. The particular construction of the rake and loader enables the device to be fastened close up behind the receiving vehicle. The belt 12 is formed of a close mesh heavy material so that grain kernels, grass blades, or leaves, which remain in the straw will be conveyed to the receiving vehicle instead of being sifted out and lost as has been heretofore the case. The rake tines 19 may be adjusted toward and away from the ground as well as toward and away from the drum 8' to compensate for varying quantities of straw or hay to be collected by the mechanism. The mechanism may be constructed of any preferred material, however, it is desired that wood or light metals be used in order that the device may be easily manipulated and drawn by horses usually employed for this purpose. The device is composed of but very few simple and inexpensive parts, and all of which are so arranged as to obviate the possibility of the same becoming broken, or in any way becoming damaged or impaired.

The carriage frame 6 is supported at its forward end by a truck indicated generally at 29. This truck comprises a pair of spaced relatively small wheels 25, supported upon an axle 26, and a post 27 connects the said axle with a bar or hitch pole 28 projecting forwardly from the carriage frame. The forwardly projecting hitch pole may be secured as by means of a hook and chain or rope to the receiving vehicle with which the device is to be used. The post 27 is provided with spaced openings 30 through any of which a set screw 31 carried by the hitch pole is adapted to project, whereby the forward end of the loader may be adjusted vertically to compensate for vehicles of various constructions and heights.

While the present is an illustration of the preferred embodiment of the invention, it is obvious that various changes in the minor details of construction and arrangement of parts may be resorted to, if desired, without departing from the spirit of the invention or exceeding the scope of the claims, and the right to make such variation in construction is hereby reserved.

What is claimed is:—

1. In a rake and loader, a carriage, a drum on said carriage, a conveyer operated by said drum, rake tines pivoted to said frame above said drum, the said tines being curved adjacent their lower ends, and a screw member connected with said tines for moving the same toward or away from said conveyer.

2. In a hay rake and loader, a carriage, a shaft disposed transversely of said carriage, a drum on said shaft, a frame secured to said carriage and projecting upwardly and forwardly therefrom, a roller at the forward end of said frame, a belt passing over said drum and roller, rake tines carried by said belt, slats disposed transversely of said belt, angle bars arranged at the sides of said frame, the said bars supporting the ends of said slats, and a retainer frame supported by said first mentioned frame and inclosing said belt.

3. In a hay rake and loader, a carriage, a conveyer on said carriage extending upwardly and forwardly therefrom, rake tines comprising elongated bars straight for the greater portion of their length and being bent into hook shape at their lower ends, the said bars being pivoted at their upper ends upon the said carriage above said conveyer and in advance of said drum, a bracket extending across said frame adjacent the lower end thereof and spanning said tines, a rod connecting all of said tines intermediate their ends, and a screw member threaded through said bracket and being connected to said tine connecting bar.

In testimony whereof I affix my signature in presence of two witnesses.

NICHOLAS W. WIEMHOLT.

Witnesses:
 WALTER REED,
 W. C. LAUER.

Copies of this patent may be obtained for five cents each, by addressing the "Commissioner of Patents, Washington, D. C."